United States Patent
Alberth, Jr. et al.

(10) Patent No.: US 7,786,901 B2
(45) Date of Patent: Aug. 31, 2010

(54) KEY PRESS REGISTRATION IN AN ELECTRONIC DEVICE WITH MOVEABLE HOUSINGS

(75) Inventors: William P. Alberth, Jr., Prairie Grove, IL (US); Daniel Herscovici, New York, NY (US)

(73) Assignee: Motorola, Inc., Schaumburg, IL (US)

( * ) Notice: Subject to any disclaimer, the term of this patent is extended or adjusted under 35 U.S.C. 154(b) by 819 days.

(21) Appl. No.: 11/695,951

(22) Filed: Apr. 3, 2007

(65) Prior Publication Data

US 2008/0246634 A1  Oct. 9, 2008

(51) Int. Cl.
*H03M 11/00* (2006.01)

(52) U.S. Cl. .......................... 341/24; 341/26; 345/168; 345/169

(58) Field of Classification Search ............. 341/20–34; 345/168–173; 455/565
See application file for complete search history.

(56) References Cited

U.S. PATENT DOCUMENTS

| | | | | |
|---|---|---|---|---|
| 3,886,543 A | * | 5/1975 | Marin ......................... | 341/24 |
| 4,670,747 A | | 6/1987 | Borras et al. | |
| 4,888,600 A | * | 12/1989 | Anderson et al. ............. | 341/24 |
| 5,241,583 A | | 8/1993 | Martensson | |
| 5,457,455 A | | 10/1995 | Lee | |
| 5,864,765 A | | 1/1999 | Barvesten | |
| 6,040,788 A | * | 3/2000 | Chambers et al. ............. | 341/26 |
| 6,587,909 B1 | * | 7/2003 | Olarig et al. ................. | 710/302 |
| 7,218,250 B2 | * | 5/2007 | Laliberte et al. ............. | 341/24 |
| 7,446,676 B2 | * | 11/2008 | Suen et al. .................... | 341/24 |
| 7,642,933 B2 | * | 1/2010 | Patel ........................... | 341/22 |
| 2006/0049965 A1 | | 3/2006 | Laliberte et al. | |

FOREIGN PATENT DOCUMENTS

| | | |
|---|---|---|
| KR | 1020020054652 A | 7/2002 |
| KR | 1020020064573 A | 8/2002 |
| KR | 1020060109771 A | 10/2006 |
| WO | 2005034480 A2 | 4/2005 |

OTHER PUBLICATIONS

"Introducing your new Motorola MOTORIZR Z3 GSM wireless phone", Z3 English User Manual, 114 pages, Sep. 19, 2006.
U.S. Appl. No. 11/565,234, filed on Nov. 30, 2006 by Motorola, Inc.

* cited by examiner

*Primary Examiner*—Albert K Wong
(74) *Attorney, Agent, or Firm*—Sylvia Chen

(57) ABSTRACT

A method for key press registration in an electronic device uses a first key press debounce limit (233) if a first housing of the electronic device has not moved relative to a second housing of the electronic device and a second key press debounce limit (236) if the first housing has moved relative to the second housing. In one implementation, the second debounce limit is at least twice the first debounce limit. By using different debounce limits based on whether housing movement has recently been detected, the electronic device reduces the effect of an inadvertent key press made while opening or closing the electronic device.

20 Claims, 4 Drawing Sheets

US 7,786,901 B2

KEY PRESS REGISTRATION IN AN ELECTRONIC DEVICE WITH MOVEABLE HOUSINGS

FIELD

Described are methods in multi-housing electronic devices for processing key presses.

BACKGROUND

Electronic devices, such as mobile stations, have different form factors such as "candy bar", "rotator", "clam shell", and "slider". Although a candy bar form factor only has one housing, the rotator, clam shell, and slider form factors have at least two housings that are designed to be moved relative to each other by a user. Prior art FIG. 4 shows a mobile station 400 with a slider form factor in a closed position, and prior art FIG. 5 shows a mobile station 500 with a slider form factor in an open position. A slider housing 410 moves relative to a base housing 430 when a user pushes the slider housing 410 up (in a y-axis positive direction). A slider housing 510 also moves relative to a base housing 530 when a user pushes the slider housing 510 down (in a y-axis negative direction).

A bumper bar 440, 540 is provided on the slider housing 410, 510 to assist the user in pushing the slider housing 410, 510 up and down. In the configuration shown, the bumper bar 440, 540 is located nearby a navigation key cluster 420, 520 that a user might accidentally press when moving the slider up and down. Even in mobile stations without a bumper bar, a user may accidentally press a key while moving the slider housing 410, 510 up and down relative to the base housing 430, 530. In one situation, accidental activation of a navigation-up key when opening the mobile station inadvertently launches a web browser. In another example, accidentally pressing a navigation-center key when closing the mobile station unintentionally activates a video camera.

DETAILED DESCRIPTION

An electronic device with moveable housings includes modules for modifying the processing of a key press if one housing of the electronic device moves relative to another housing of the electronic device either shortly before or shortly after the key press. If a key press on an error-prone key occurs and is registered, and a housing moves shortly afterwards, the registered key press is canceled. Intelligently defining error-prone keys and implementing the modules can decrease user frustration due to unintentional key activation when opening and closing electronic devices.

Also, if a housing of the electronic device moves, then a key debounce limit of any error-prone keys is increased. Thus, a key press will need to be held for a longer time period before being registered. This also can reduce user frustration, because shortly after opening or closing the electronic device, a temporary inadvertent key press of an error-prone key will simply not be registered while a deliberate longer key press will be registered.

A method for key press registration in an electronic device uses a first key press debounce limit (233) if a first housing of the electronic device has not moved relative to a second housing of the electronic device and a second key press debounce limit (236) if the first housing has moved relative to the second housing. In one implementation, the second debounce limit is at least twice the first debounce limit. By using different debounce limits based on whether housing movement has recently been detected, the electronic device reduces the effect of inadvertent key presses made while opening or closing the electronic device.

An electronic device has a first housing, a second housing, a controller, at least one input key on the first housing, and a variety of modules used by the controller to: detect movement of one housing relative to another, set a debounce limit, debounce a key press, register a key press, and cancel a registered key press. In one embodiment, if a key is pressed and movement occurs before the debounce limit is reached, the key press is ignored. In another embodiment, if movement is detected then the debounce limit is increased so that a longer debounce delay occurs before that key press is registered. In other embodiments, if movement is detected shortly after a key press is registered, that registered key press will be canceled as being inadvertent and any processes started by that registered key press will be halted or canceled.

Figure 1:
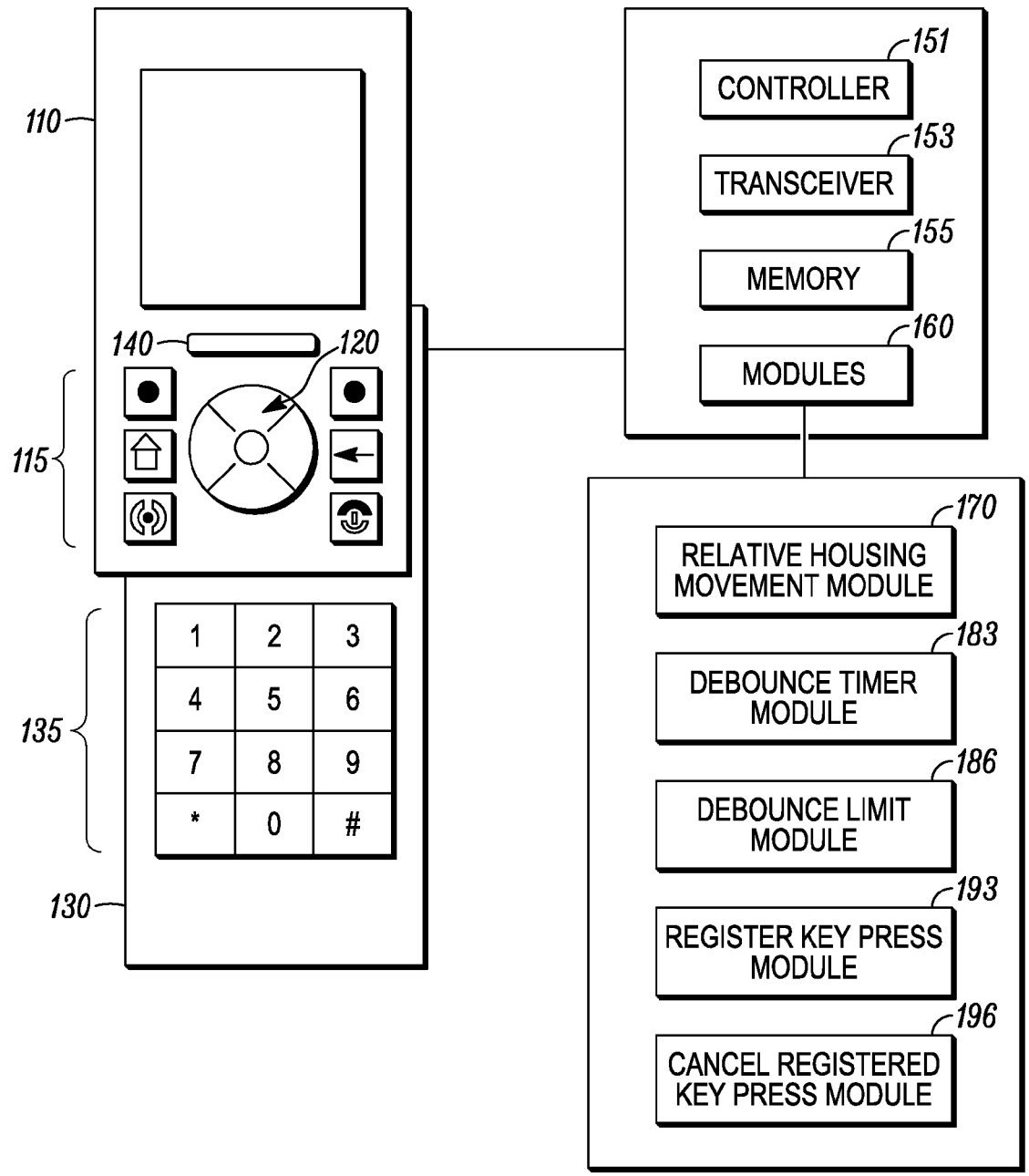
FIG. 1 shows an embodiment of an electronic device with moveable housings.

FIG. 1 shows an embodiment of an electronic device 100 with housings 110, 130 that move relative to each other. Although the electronic device shown is a wireless telephone, the electronic device could be implemented as a two-way radio, a messaging device, a personal digital assistant, a portable computer, an electronic toy or game console, a cordless telephone, a remote controller, or another type of electronic device. Also, although the electronic device shown has a slider form factor, the electronic device could alternately have a clam shell form factor, a rotator form factor, a tri-fold wallet form factor, or another type of form factor with two or more housings that are moveable relative to each other.

As shown in FIG. 1, a first housing 110 is moveable relative to a second housing 130 in the y-axis direction. For electronic devices with other form factors, movement of one housing relative to another housing may be in other directions such as circularly around an x-axis pivot for clam shell form factors, circularly around a y-axis pivot for rotator form factors, or circularly around more than one z-axis pivot for tri-fold wallet form factors.

As shown in this embodiment, the first housing 110 has a first set of keys 115 and the second housing has a second set of keys 135. While the first set of keys 115 is depicted as two soft keys (shown with dots), a navigation key cluster 120, and four function keys (shown with menu-home, go-back, on, and off icons), and the second set of keys 135 is depicted as a 12-key keypad, it is understood that the sets of keys 115, 135 may take various forms depending on the implementation. Also, while the keys are depicted as standard popple-dome-switch keys, the keys may alternately be implemented using a touch sensitive surface. A touch sensitive surface may be, for example, resistive, inductive, or capacitive.

A bumper bar 140 projects from the xy-planar surface of the electronic device 100 to assist the user in pushing the first housing 110 up and down along the y-axis relative to the second housing 130. This bumper bar 140 is located near the navigation key cluster 120, and a user might accidentally press one or more keys of the navigation key cluster 120 when moving the first housing 110 up and down relative to the second housing 130.

Through the engineering and development process, user experimentation, and/or customer feedback, certain keys can be identified as error-prone keys. Error-prone keys are keys that users (as a group) often inadvertently press—usually when trying to do something else. In this embodiment, it is noted that keys within the navigation key cluster 120 are sometimes inadvertently pressed when users are only trying to open and close the electronic device 100. Through user experience, the six other keys in the first set of keys 115 are not found to be error-prone and the second set of keys 135 is also not error-prone. Of course, different embodiments of the electronic device may have different error-prone keys identified. The identification of error-prone keys may depend on factors such as the form factor of the electronic device, the overall width/height/depth of the device (along the x/y/z-axes), the dimensions of the individual housings, the ways that the housings move relative to each other, the position of each key on a housing, each key's implementation technology (e.g., popple-dome-switch, touch sensitive resistive surface, etc.), the contact surface of the key (e.g., a key with a protruding key-cap, a key with a surface that is level with the housing, a key with a surface recessed from the housing surface), group user characteristics (e.g., long fingernails, large hands, etc.), and various other factors.

The mobile communication device includes a controller 151, a transceiver 153 for wireless communications with a compatible communication device (not shown), at least one memory 155, and various modules 160. The modules 160 shown are a relative housing movement module 170, a debounce timer module 183, a debounce limit module 186, a register key press module 193, and a cancel registered key press module 196. The modules 160 carry out certain processes that will be described later. The modules 160 can be implemented in software (such as in the form of one or more sets of pre-stored instructions) and/or hardware, which can facilitate the operation of the electronic device 100 as discussed below. The modules 160 may be installed during manufacture of the electronic device 100 or can be installed after distribution by, for example, a downloading operation.

As with electronic devices having other multi-housing form factors, the slider form factor electronic device includes a position detection mechanism (not shown) so that a relative housing movement module 170 can detect when the first housing 110 has moved relative to the second housing 130. The sensor can be a magnetic sensor, a mechanical switch, a fastening mechanism such as a spring latch, an optical sensor, or another type of position detection mechanism or sensor that detects a change in the relative positions of the first housing 110 and the second housing 130.

The debounce timer module 183 and the debounce limit module 186 contain instructions that reset a debounce timer and set a debounce limit so that a key press can be debounced as will be described in further detail with respect to FIG. 2. Because key contacts vibrate open and closed (i.e., "bounce") for a number of milliseconds when a key is activated by a user, a key is debounced by the microcontroller 151 using software and a time delay set by the debounce limit module 186.

The register key press module 193 and the cancel register key press module 196 contain instructions that proceed with functions indicated by a key press or cancel functions indicated by a key press.

The electronic device 100 compensates for accidental depression of error-prone keys 120 by using the debounce limit module 186 to adjust a debounce limit when relative housing movement occurs as detected by relative housing movement module 170. If no housing movement was recently detected, the chance of accidentally pressing an error-prone key is slight, and the debounce limit is set to a standard first time value using the debounce limit module 186. If a key is pressed shortly after housing movement is detected by relative housing movement module 170, the debounce limit is increased in the debounce limit module 186 so that the key press will need to be held down longer to register. If a key press was already registered by the register key press module 193 shortly before housing movement was detected, the electronic device 100 cancels the registered key press as being inadvertent using the cancel registered key press module 196.

Figure 2:
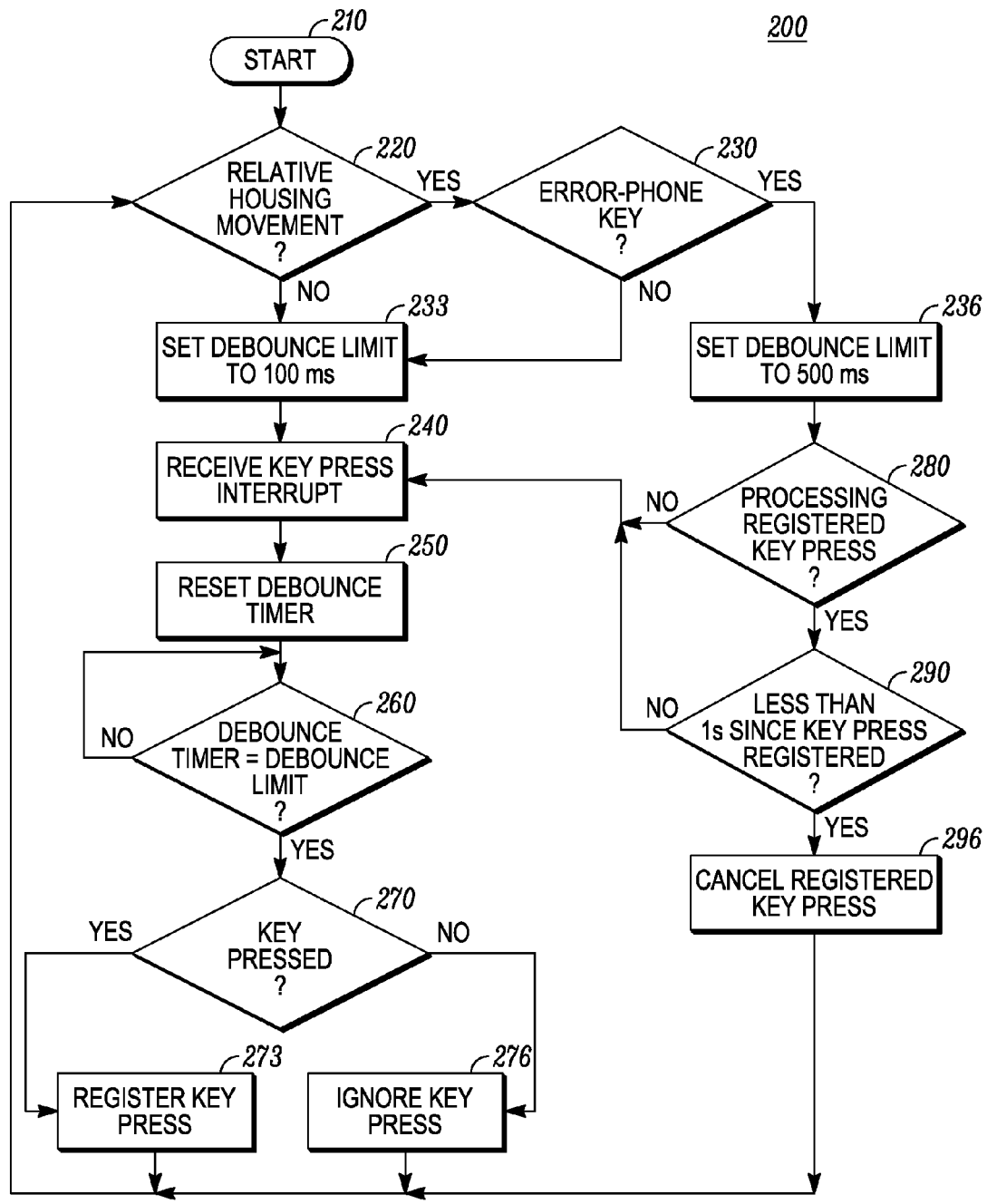
FIG. 2 shows a flowchart of a first method for key press registration.

FIG. 2 shows a flowchart 200 of a first method for key press registration. Upon starting the method in step 210, step 220 determines whether relative housing movement has occurred. Relative housing movement module 170 (FIG. 1) can be used, which may interface with mechanical, magnetic, optical, or other mechanisms to detect movement of one housing 110 (FIG. 1) relative to another housing 130 (FIG. 1). If step 220 determines no relative housing movement has occurred, step 233 sets a key debounce limit to a first time value such as 100 milliseconds. This first time value can be a key debounce limit value that is standard in the field of the electronic device being implemented. The debounce limit module 186 (FIG. 1) can be used to set the debounce limit value.

When step 240 receives a key press interrupt from the first set of keys 115 (FIG. 1), step 250 resets a debounce timer to zero and the timer proceeds as is very well known in the art. This can be implemented in a debounce timer module 183 (FIG. 1). When step 260 determines that the debounce timer has reached the debounce limit (previously set to 100 milliseconds in step 233), the matrixed lines of the first set of keys 115 are polled by step 270 to determine whether a key is still depressed. If a key is depressed, then step 273 registers that key press. Register key press module 193 directs the controller 151 (FIG. 1) to act upon that key press. In some situations, registering a key press launches a software application (such as a web browser, camera software, electronic mail client, instant messaging client, contacts software, etc.), enters and displays a letter or number, moves a cursor, dials a telephone number (e.g., speed dial), or accesses a menu of the electronic device. If no key press is detected at step 270, the key press that triggered the interrupt at step 240 is ignored in step 276.

After either step 273 or step 276 occurs, the flow returns to step 220 to detect whether relative housing movement has occurred. As mentioned previously, relative housing movement module 170 can be used to implement step 220. If relative housing movement has occurred, step 230 determines if an error-prone key has been identified.

An error-prone key is a key that is often inadvertently pressed when users are trying to do something else with the electronic device. An error-prone key will probably be identified during engineering and development of the electronic device, during user testing, and/or by customer feedback. For example, the navigation key cluster 120 can be aggregately identified as error-prone keys; the navigation-up, the navigation-down, the navigation-right, the navigation-left, and the navigation-center keys all being considered error-prone keys. Alternately, perhaps only the navigation-up and the navigation center keys are identified as error-prone. Meanwhile, based on testing and/or user feedback, the other keys of the first set of keys 115 (FIG. 1) and the entire second set of keys 135 (FIG. 1) are found to be not error-prone. Of course, different implementations of the electronic device may have different error-prone keys. The classification of a key as being error-prone will depend upon the form factor of the electronic device, the location of the set(s) of keys and any surrounding non-key space, the existence of a bumper bar or other assistance feature for moving one housing relative to another housing, and the dexterity of the user base, among other factors.

If no keys are error-prone, then the debounce limit is still at the first time value (e.g., 100 milliseconds) and any key press is treated as if no relative housing movement had occurred. If there are error-prone keys, step 236 sets the debounce limit to a second time value, such as 500 milliseconds. In this implementation, the identification of at least one error-prone key (e.g., navigation-up and navigation-center) in a set of keys (e.g., the first set of keys 115) results in an increased debounce time for all the keys in the first set of keys 115 when relative housing movement is detected.

In this example, the second time value is at least twice as long as the first time value, and the second time value is set using the debounce limit module 186 (FIG. 1). If step 280 determines that a registered key press (from step 273) is not being processed by the electronic device, the flow goes to step 240 and key presses are evaluated using a 500 millisecond debounce limit instead of a standard 100 millisecond debounce limit. Thus, if the user holds the key down for less than 500 milliseconds, then the key press will be ignored according to step 276. If the user holds the key down for longer than 500 milliseconds, the key press will be registered according to step 273. Note that if relative housing movement had not occurred or there was no error-prone key, then holding the key for less than 500 milliseconds (but more than 100 milliseconds) would have resulted in a registered key press.

If the electronic device is still processing a registered key press (from step 273) and step 290 determines that it has been less than a third time value since the key press was registered, then step 296 cancels the registered key press. Canceling a registered key press can be implemented using the cancel registered key press module 196 (FIG. 1) and involves terminating any software applications being launched due to the registered key press, clearing any letter or number entered into the electronic device and displayed, returning a cursor to its previous location, and/or resetting the electronic device to the state it was in immediately prior to the key press being registered. In this implementation, the third time value is at least twice as long as the second time value and is set at 1 second. Alternate implementations can have the third time value being equal to the second time value or greater than the second time value. If step 290 determines that it has been over 1 second since the key press was registered, then the flow returns to step 240 for key press detection with a 500 millisecond debounce limit.

By setting a second time value for situations where relative housing movement has recently occurred and an error-prone key has been identified, the method prevents inadvertent key presses from consuming significant processing time and processing power. If a key is inadvertently pressed shortly after relative housing movement is detected, then a second time value longer than the first time value promotes registration of a key that has been firmly depressed while ignoring a momentary key press—probably occurring while a user was changing configurations of the housings. Also, a registered key press is canceled if relative housing movement occurs within a third time value since the key press was registered thus limiting any waste of power or processor resources.

Although the steps in this flow chart have been set forth in a particular order, they may be varied for specific implementations—including implementations dependent on processor speed and other functions of the electronic device. For example, it is possible to receive a key press interrupt before evaluating whether a relative housing movement has occurred, and then set the debounce limit accordingly. It is also possible to set a second time limit value only for those keys that have been identified as error-prone and continue to use the first time limit value for the other keys. Also, step 290 might be applied only to error-prone keys and not to other keys of the electronic device.

Figure 3:
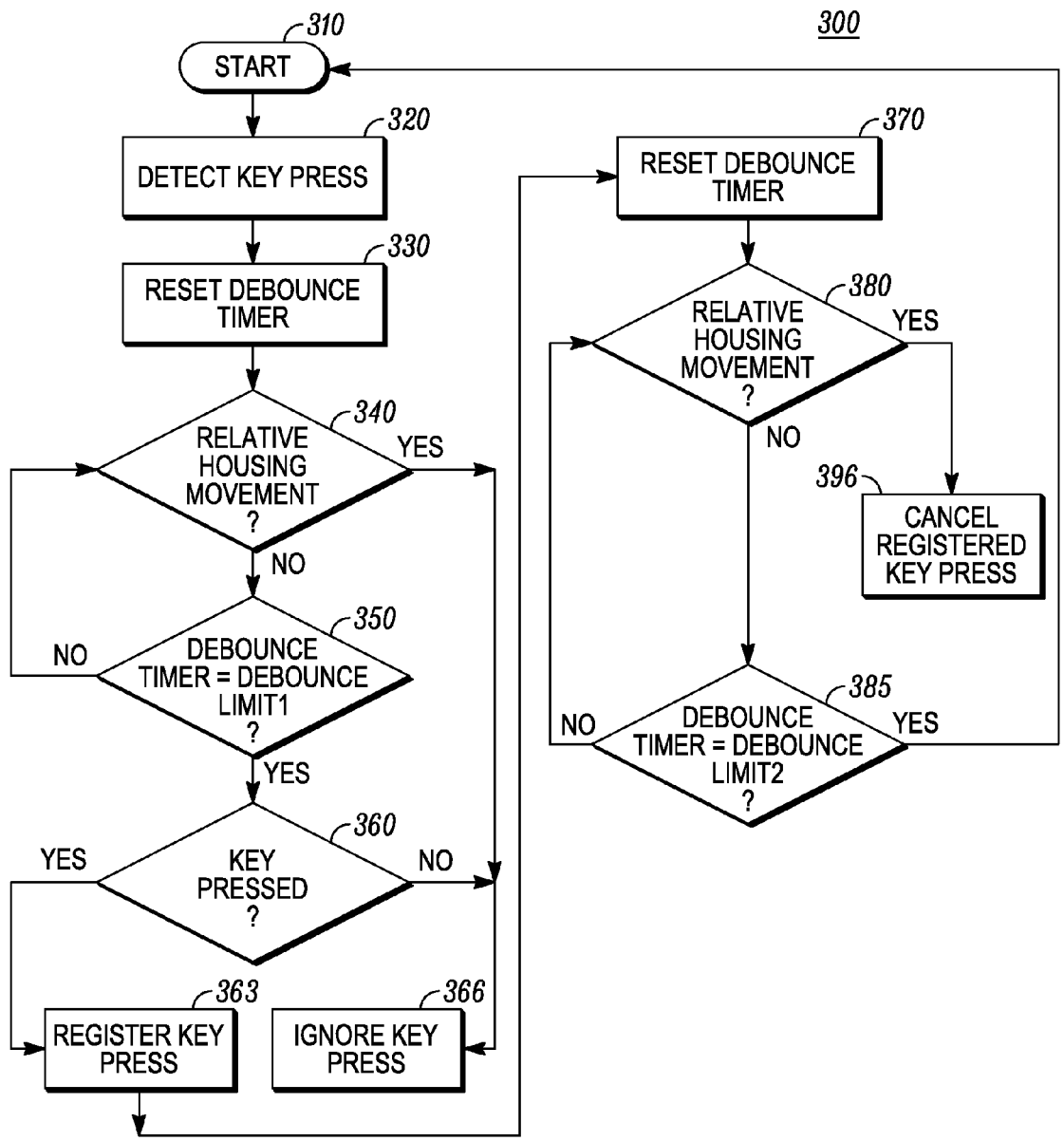
FIG. 3 shows a flowchart of a second method for key press registration.
Figure 5:
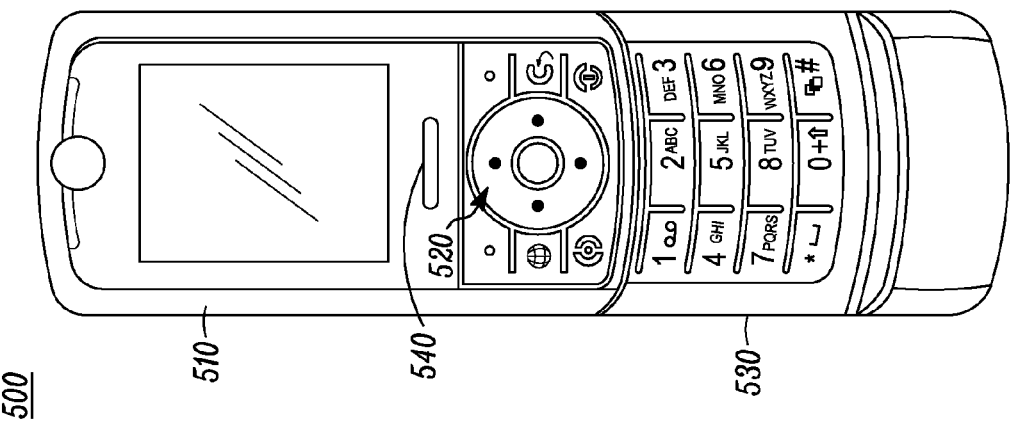
FIG. 5 shows a prior art mobile station with a slider form factor in an open position.
Figure 4:
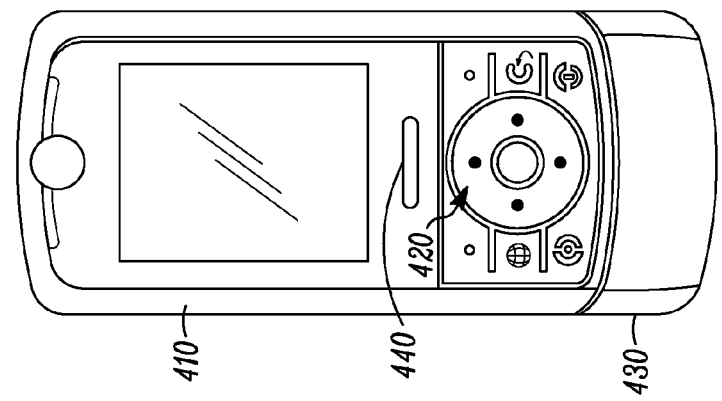
FIG. 4 shows a prior art mobile station with a slider form factor in a closed position.

FIG. 3 shows a flowchart 300 of a second method for key press registration. This alternate flowchart allows an electronic device to ignore a key press if relative housing movement occurs during the debounce delay and also allows the electronic device to cancel a registered key press if relative housing movement occurs a short time after the key press was registered.

The process starts at step 310, and step 320 detects a key press. A key press can be detected through an interrupt line as is well known in the art. Step 330 starts a debounce timer, which can be implemented using a debounce timer module 183 (FIG. 1). Step 340 monitors relative housing movement and can be implemented using relative housing movement module 170 (FIG. 1). If housing movement is detected before the debounce timer reaches a first time value (e.g., 100 milliseconds as set using the debounce limit module 186 (FIG. 1)), then step 366 ignores the key press. After the debounce timer has expired in accordance with step 350, the controller 151 (FIG. 1) checks whether a key is still pressed at step 360. If a key is not pressed at step 360, step 366 ignores the key press detected in step 320. If a key is still pressed at step 360, then the key press is registered at 363 using, for example, register key press module 193 (FIG. 1).

After registering a key press at step 363, a debounce timer is started at step 370. The debounce timer of step 370 can simply reuse the debounce timer module 183 or it can be a separate timer module. Step 380 monitors relative housing movement, similar to step 340, and if step 380 detects relative housing movement before a second time value is reached then step 396 cancels the registered key press (from step 363) as previously described with respect to step 296 (FIG. 2) and cancel registered key press module 196 (FIG. 1). If no relative housing movement occurs before step 385 determines that the debounce timer has reached the second time value, then the registered key press proceeds and the process returns to step 310. The second time value may be equal to the first time value of step 350, or it may be different from the first time value of step 350.

The disclosed methods and devices for key press registration use different key press debounce limits based on whether a first housing of an electronic device has recently moved with respect to a second housing of the electronic device. By using different debounce limits, the electronic device reduces the effects of an inadvertent key press made while opening or closing the electronic device. Also, a previously registered key press can be canceled if it occurs with a specified time span prior to housing movement. By reducing the effect of inadvertent key presses, users will not become annoyed with the electronic device while merely trying to open or close it, and battery life can be extended.

This disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiments) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method for key press registration in an electronic device comprising:
   setting a key press debounce limit to a first time value; and
   setting the key press debounce limit to a second time value if a first housing of the electronic device has moved relative to a second housing of the electronic device.

2. The method of claim 1, further comprising:
   resetting a debounce timer when a key press interrupt is received; and
   determining whether a key is pressed when the debounce timer reaches the key press debounce limit.

3. The method of claim 2, further comprising:
   registering a key press if a key is pressed when the debounce timer reaches the key press debounce limit.

4. The method of claim 3 further comprising:
   canceling a registered key press if less than a third time limit has elapsed between the registering a key press and a detection of movement of the first housing relative to the second housing.

5. The method of claim 4, wherein the third time limit is longer than the second time limit.

6. The method of claim 5, wherein the third time limit is at least twice the value of the second time limit.

7. The method of claim 2, further comprising:
   ignoring a key press if a key is not pressed when the debounce timer reaches the key press debounce limit.

8. The method of claim 2, further comprising:
   ignoring a key press if the first housing has moved relative to the second housing before the debounce timer reaches the key depress bounce limit.

9. The method of claim 1, wherein setting the key press debounce limit to a second time value comprises:
   setting the key press debounce limit for an error-prone key to the second time value.

10. The method of claim 9, wherein the error-prone key is a component of a navigation key cluster.

11. The method of claim 9, wherein the error-prone key is a soft key.

12. The method of claim 1, wherein the second time value is longer than the first time value.

13. The method of claim 12, wherein the second time value is at least twice the first time value.

14. An electronic device having a first housing and a second housing comprising:
   a controller;
   at least one input key, on the first housing, coupled to the controller;
   a relative housing movement module, coupled to the controller, for detecting movement of the first housing relative to the second housing;
   a debounce limit module, coupled to the controller, for setting a key press debounce limit,
   wherein the key press debounce limit is set to a first time value if the relative housing movement module has not detected movement of the first housing relative to the second housing and the key press debounce limit is set to a second time value if the relative housing movement module has detected movement of the first housing relative to the second housing.

15. The electronic device of claim 14 further comprising:
   a debounce timer module, coupled to the controller, for resetting a debounce timer when an interrupt is received from the at least one input key.

16. The electronic device of claim 15 further comprising:
   a register key press module, coupled to the controller, for registering a key press detected when the debounce timer reaches the key press debounce limit.

17. The electronic device of claim 16 further comprising:
   a cancel registered key press module, coupled to the controller, for canceling a registered keypress if less than a third time value has elapsed between the registering a key press and detecting movement of the first housing relative to the second housing.

18. The electronic device of claim 14, wherein the at least one input key is a touch sensitive surface.

19. The electronic device of claim 14, wherein the at least one input key is a navigation key.

20. The electronic device of claim 14, wherein the at least one input key is a soft key.

* * * * *